US006624903B1

(12) United States Patent
Miquel et al.

(10) Patent No.: US 6,624,903 B1
(45) Date of Patent: *Sep. 23, 2003

(54) TECHNIQUES FOR OVER-LIFE ENCODING OF MEDIA TYPE AND ROLL LENGTH

(75) Inventors: Antoni Gil Miquel, Sabadell Barcelona (ES); Alan Lobban, Barcelona (ES); James C Smith, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,753

(22) Filed: Jan. 10, 2000

Related U.S. Application Data

(63) Continuation-in-part of application No. 08/871,080, filed on Jun. 9, 1997, now Pat. No. 6,047,110.

(51) Int. Cl.[7] .................................................. G06F 15/00

(52) U.S. Cl. ...................................... 358/1.12; 358/1.14

(58) Field of Search ............................ 358/1.1, 1.6, 1.9, 358/1.12, 1.14, 1.17; 399/12, 13, 23, 25, 45, 72, 62; 400/103, 104, 107; 382/168, 175, 182

(56) References Cited

U.S. PATENT DOCUMENTS 4,533,926 A * 8/1985 Foldvari et al. ............ 346/136
4,721,058 A * 1/1988 Hayamizu et al. .......... 118/665
4,782,365 A * 11/1988 Takagi ......................... 355/38
5,138,463 A * 8/1992 Morimoto et al. .......... 358/296
5,524,413 A * 6/1996 Fukuda .......................... 53/64
5,528,413 A * 6/1996 Leichner et al. ............ 324/693
5,751,303 A * 5/1998 Erickson et al. .............. 347/16
5,816,165 A * 10/1998 Huston ....................... 101/490
6,047,110 A * 4/2000 Smith ........................ 358/1.12

* cited by examiner

*Primary Examiner*—Gabriel Garcia

(57) ABSTRACT

Techniques for encoding data identifying media type and roll length information on a print media for a large format printer. A method for described for identifying at least a media length value for a roll-type media to be printed upon to a printer controller in a printer. The method includes in one embodiment, keeping track of the length of media used during printing operations, prior to removing the roll from the printer, printing an indicia on a remaining portion of the roll which identifies at least the remaining length of the print medium, removing the roll from the printer, reinstalling the removed roll in the printer, reading the indicia to determine the remaining length of the media, and using the remaining length information during subsequent printing operations. The data can be encoded as a grayscale code which is read by the printer's optical sensor, or be a human-readable indicia. The indicia can include media type information and media length information in machine readable form, and a human-readable portion showing the length of the roll. The indicia can include a user-defined code identifying the media.

28 Claims, 4 Drawing Sheets

TECHNIQUES FOR OVER-LIFE ENCODING OF MEDIA TYPE AND ROLL LENGTH

CROSS-REFERENCE TO RELATED APPLICATIONS

This application is a continuation-in-part of application Ser. No. 08/871,080, filed Jun. 9, 1997, entitled METHOD AND APPARATUS FOR IDENTIFYING A PRINT MEDIA TYPE, now U.S. Pat. No. 6,047,110, the entire contents of which are incorporated herein by this reference.

TECHNICAL FIELD OF THE INVENTION

This invention relates to ink-jet printing devices, and more particularly to techniques for associating media type and roll length with media rolls.

BACKGROUND OF THE INVENTION

Printers and plotters in use today for printing text/graphics typically have the capability of printing on various types of print media, such as plain paper, special papers such as coated paper, matte paper, and the like, as well as various non-paper media such as velum, film etc. Printer parameter modifications vary with the type of media, and can include changes in color maps and print modes. The printers and plotters typically include sensors for sensing the presence of the print medium in the media path, and the medium edges.

Large scale plotters typically support roll-form print media, i.e., a supply of paper or transparent film on a roll. One such device is the Design Jet product family of large scale plotters marketed by Hewlett-Packard Company. A cutter is employed to cut the medium after the plot is completed so that the finished plot is separated from the roll.

If one could predict the end of a media roll, the printer could be left printing alone overnight, thus substantially increasing the unattendedness capability of the printer. With the Design Jet 2500 CP, with 400 cc of ink per cartridge, the unattendedness limitation from uncertainty about the remaining media quantity is even more a problem.

Typically, there are two types of information that a large format printer would like to know from the media roll, its type (coated, glossy, etc.) and its remaining length. The first type of information is used for applying the correct print modes to each media type. The second is needed to know so that one does not run out of media in the middle of a plot.

The conventional approach for providing the first type of information to the printer is through a manual input. Thus, the user may use a display panel on the printer (or a dialogue box in the printer driver that is resident on the host computer). This action involves the user scrolling through a list of displayed media types, until one appears which matches the media type to be loaded on the printer. The user selects the media when loading the media roll, and the printer controller automatically establishes printer parameters in accordance with the selection. The printer will present as a default the media type that was most recently used, and because a reduced set of media types was typically supported, the manual input process was in the past not very burdensome or limiting.

As for the media length, the printer could be counting the length of media it has been printing on, and so it would be theoretically possible to tell the user when the media roll is reaching its end, just by telling the printer the initial length of the media roll. The problems here start when a user decides to unload a media roll before it has ended, in order, for example, to print onto another kind of media. In this case, the media length information that the printer may have recorded gets lost. This information is key to being able to resume length counting when the media roll is reloaded. Thus, the ability to unload a partially used media roll and re-load it at some later time has made the task of predicting the roll's end unfeasible.

It would therefore be advantageous to allow media type information and/or remaining media quantity to be retrieved by the printer from a media roll without any user intervention.

It would further be advantageous to present the media type information and/or remaining media quantity in a human-readable form on a partially used roll.

SUMMARY OF THE INVENTION

A method is described for identifying at least a media length value for a roll-type media to be printed upon to a printer controller in a printer. The method includes, in one embodiment, keeping track of the length of media used during printing operations, prior to removing the roll from the printer, printing an indicia on a remaining portion of the roll which identifies at least the remaining length of the print medium, or information from which the remaining length can be determined, such as the length previously used from the roll, removing the roll from the printer, installing the removed roll from the printer, reading the indicia to determine the remaining length of the media, and using the remaining length information during subsequent printing operations using the removed roll. The indicia can be in human-readable form, and the user after reading the remaining length data, manually inputs this information into the printer through a control panel or other input device. The printer controller thus obtains the length information corresponding to the reloaded roll. The indicia can also be printed on the roll in a machine-readable form, and the printer can read the data as the roll is reloaded into the printer.

According to another aspect of the invention, the data is encoded as a grayscale code which is read by the printer's optical sensor. The indicia can include media type information and media length information in machine readable form, and a human-readable portion showing the length of the roll.

According to another aspect, the indicia can include a user-defined code identifying the media.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

Hereafter, the invention will be described in the context of an inkjet plotter/printer which utilizes a roll of media. It is, however, to be understood that the invention is equally applicable to other types of printers that either employ roll media, folded media or, in certain cases, individual media sheets.

Figure 1:
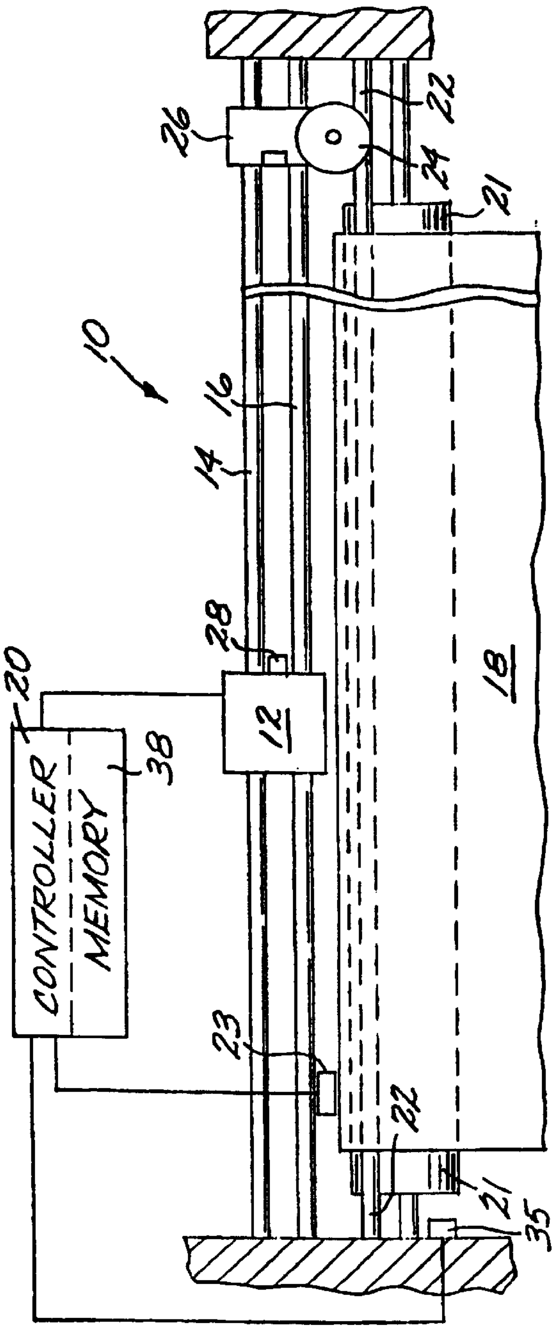
FIG. 1 is a schematic frontal view of a printer employing roll media, which printer is adapted to perform the invention hereof.

Referring to FIG. 1, printer 10 includes an ink jet printhead 12 which translates along a pair of slider bars 14 and 16 across the width of media 18. In the known manner, a controller 20, by control signals sent to inkjet printhead 12 causes printhead 12 to traverse along slider bars 14 and 16 and to eject ink droplets onto media 18 which passes therebeneath. Media 18 passes over a roll 21 which positions media 18 accurately beneath printhead 12 for printing. Media 18 also passes over a cutter bar 22 which, in cooperation with a cutter 24 (similar to a pizza cutter), enables a transverse cut to be made across media 18.

Cutter 24 is mounted on a carrier 26 which is also mounted for sliding movement along slider bars 14 and 16. When printhead 12 is moved into contact with carrier 26, a coupling mechanism 28 enables carrier 26 to move along with printhead 12 and to cut off a section of media 18.

Figure 2:
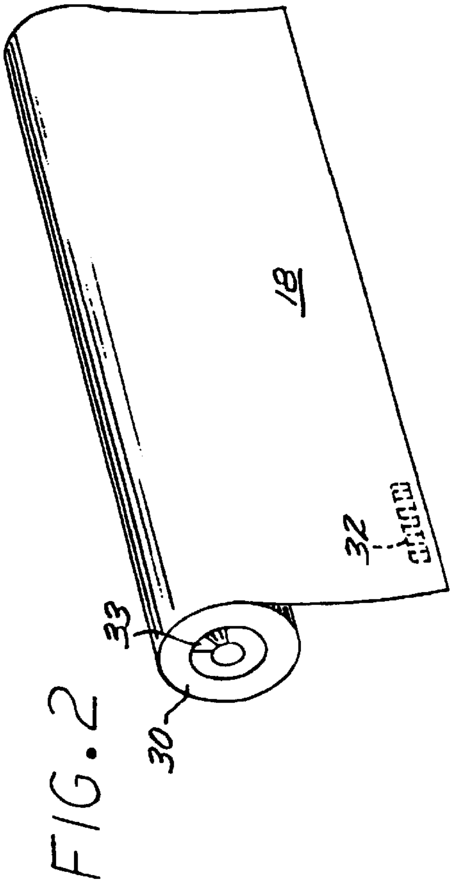
FIG. 2 is a perspective view of a roll of media, showing a positioning of data which identifies, at least, the media type.

Referring to FIG. 2, a roll 30 of media 18 is shown, before mounting on printer 10. In first embodiment, the leading edge of media 18 includes coded indicia 32 identifies at least, the media type and, preferably, further identifies the size of the media and its remaining length. Coded indicia 32 is initially printed on the leading edge of media when the media is produced at the factory. It may be configured in the form of the bar code or any other indicia which is readable by an optical sensor 34 (see FIG. 1). In a second embodiment, coded indicia 33 may be printed on an end of roll 30 (or applied via a label) where it can be read by a further optical sensor 35 (FIG. 1).

Sensor 34 is positioned to read coded indicia 32 as it passes thereover. Data read from the coded indicia is fed to controller 20 which stores the data in a memory 38. Controller 20 then utilizes the data derived from the indicia to set parameters for control of printer 10 (i.e., in accordance with the media type identified by the coded indicia).

Controller 20 further causes roller 21 to move media 18 a short distance so that coded indicia 32 passes cutter bar 22. Printhead 12 is then moved to engage carrier 26. Thereafter, printhead 12 drags carrier 26 and cutter 24 across media 18, cutting off the portion of media 18 which carries coded indicia 32. Normal printing/plotting then can occur. If the system also employs coded indicia 33 and sensor 35, there is no requirement that the media be initially imprinted with coded indicia 32, thus avoiding the cutting action when a brand new roll is mounted. However, thereafter, as will be understood, the first and second embodiments operate in the same manner.

Figure 3:
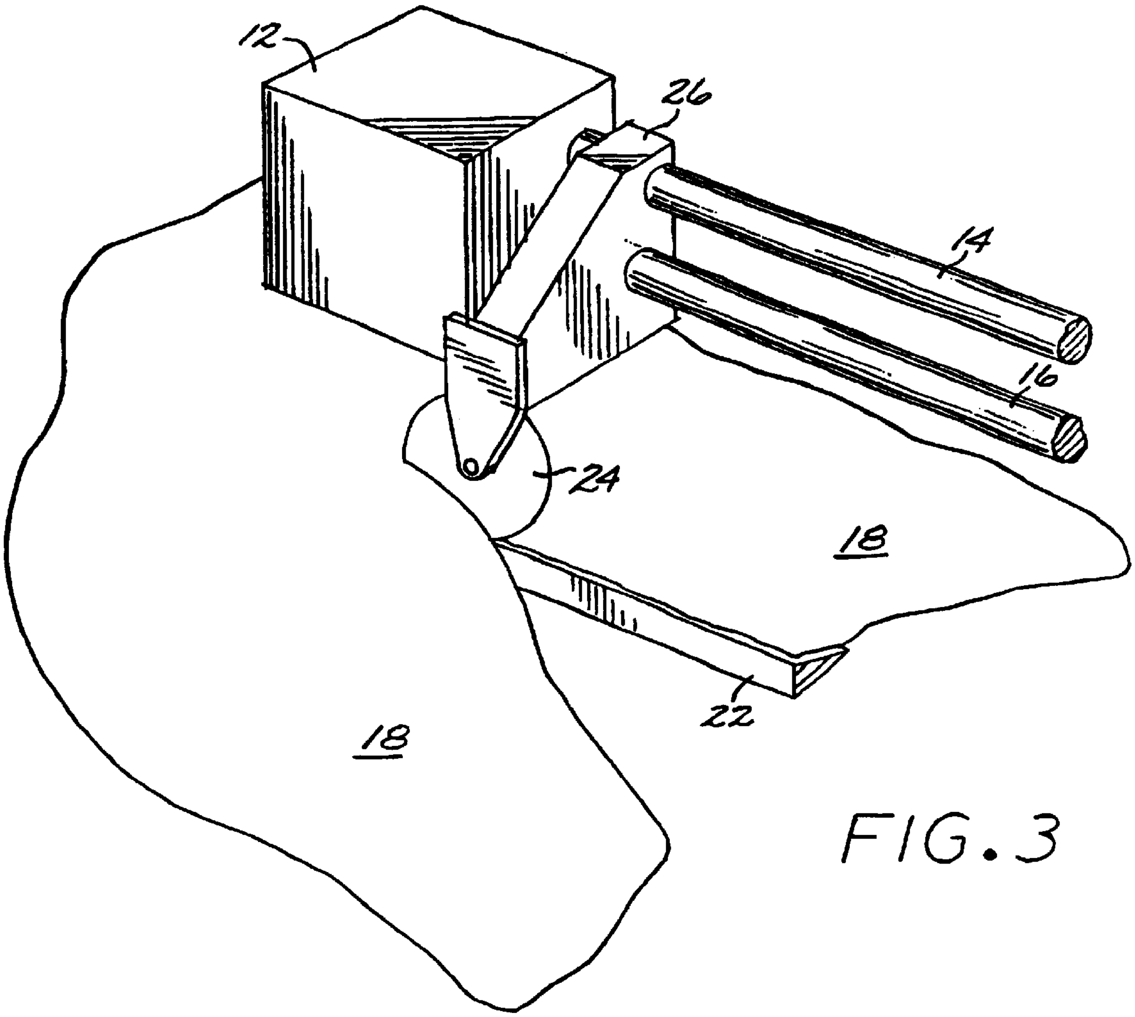
FIG. 3 is a perspective view of a printhead and media cutter employed on the printer of FIG. 1.
Figure 4:
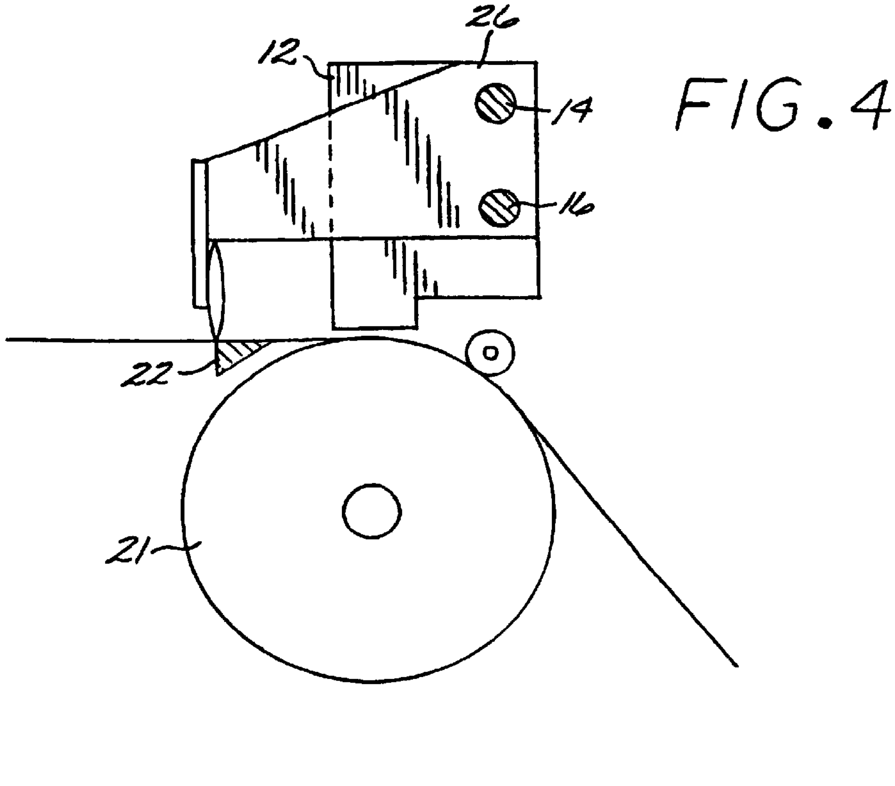
FIG. 4 is a schematic end view of the structure shown in FIG. 3.

Referring to FIG. 3, a perspective view illustrates the action of inkjet printhead 12, carrier 26 and cutter 24 as a portion of media 18 is being cut which contains the coded indicia. FIG. 4 illustrates a schematic end view of the structure of FIG. 3, as the cutting action takes place.

Once the section media 18 which contains coded indicia 32 has been removed, printer 10 is ready to print or plot a print job. When the printing of a sheet is finished, the cutting action, above described, again takes place to enable the printed sheet to be removed from the roll of media 18.

At such time a new coded indicia 32 may be printed on a leading edge of media 18 by printhead 12, or such printing action can be inhibited until requested by the user. The reason for this additional print action is to emplace coded indicia on the media so that the user can change media roll 30 between plots or print jobs. The printer/plotter on the which roll 30 is newly mounted is then able to read the coded indicia and to establish appropriate control parameters. In any event, if both sensors sense coded indicia, the coded indicia on the leading edge of the media governs.

If coded indicia 32 is printed on media 18 after each print job, the disadvantage is that a portion of media 18 which includes coded indicia 32 is cut off before starting each print/plot action. The preferred technique, which is entirely unobtrusive until the user wishes to change the roll of media, is to enable the user to select an "unload" command which enables controller 20 to cause printhead 12 to print coded indicia 30 on the end of media 18. Coded indicia 32, in addition to identifying the media type, also identifies the remaining length of media 18. Such data enables a next printer/plotter on which media roll 30 is mounted to determine both the available media length and to select proper print control parameters for the media.

Figure 5:
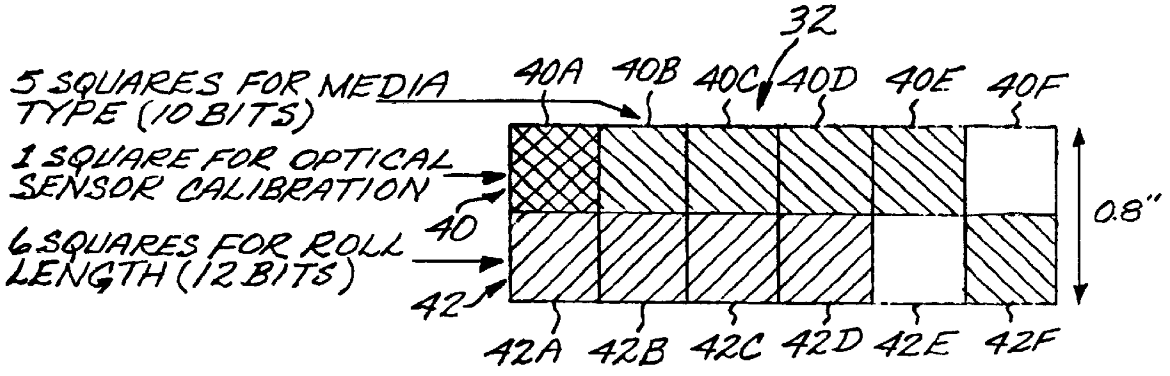
FIG. 5 illustrates an exemplary media signature indicia in accordance with an aspect of the invention.

In accordance with an aspect of this invention, the machine-readable media signature code or indicia 32 is placed on the leading edge of a new roll of print media, e.g. at its top left or top right corner. Since this will typically be done by the media manufacturer, this code will be referred to sometimes hereinafter as the "manufacturer code." The manufacturer code indicia can be imprinted on an adhesive backed label, printed directly on the media, or applied in other known ways. The indicia in an exemplary embodiment illustrated in FIG. 5 includes a grayscale code comprising two rows 40, 42 and six columns of grayscale squares. The first, leftmost square 40A in the top row is used for optical sensor calibration. The sensor in this exemplary embodiment includes a light source such as an LED array and an optical receiver. Calibration of the sensor includes adjusting the power to the LEDs and the gain of the receiver, so that the analog-to-digital converter (ADC) responsive to the sensor analog output delivers an all one reading on black, and an all zero reading on white. For example, if 10 bits are used, then black corresponds to digital code 1023, and white to 0. To calibrate for white, the sensor is first positioned over a white background such as a white print medium, and the sensor reading taken. To calibrate for black, the sensor is positioned on top of the calibration target, i.e. black square 40A, and different LED bias points and amplification gains are tried, in order to chose the optimal settings. By increasing the LED's lightness step-by-step, the digital counts from the ADC go up to 1023, at which point the increasing of the bias is stopped, since the saturation area of the receiver has been reached.

The remaining five squares 40B–40F of the indicia are used to provide ten bits of data defining the media type. On the bottom row 42, all six squares 42A–42F are used to provide roll length data, i.e. twelve bits of data. In an exemplary embodiment, the height of the indicia 32, i.e. the dimension in the direction of media advance, is about 0.8 inch.

This grayscale code can take advantage of an existing printer line sensor functionality for color calibration. In the HP DesignJet 2500 CP large scale printer, for example, a complete 10-bit data word is readable from every square. Once the sensor settings have been determined to deliver a 1023 when reading on black, using the above calibration technique, the sensor can then be positioned on top of each square. The amount of light that is reflected by each square grayscale patch is measured, and consequently a 10-bit number is obtained for this example. If four different gray levels are encoded for each square, e.g. 0%, 33%, 66% and 100% black, the sensor will read four corresponding values, 0, 337, 675 and 1023. This provides margin for noise, since any value smaller than 337/2=168 will be interpreted as a 0, and any value from 169 to 505 will be interpreted as 337, and so on. This large noise margin would allow the encoding of far more bits in each square (e.g. 8 or 9), which could be useful for larger rolls of media, or to increase the accuracy of the length encoding. Thus, for the indicia illustrated in FIG. 5, a 2-bit signal (that is, distinguishing only among four grayscale levels per square) is read, in order to gain robustness. This provides a technique to encode up to $2^{10}$=1024 media types and $2^{12}$=4096 length intervals, enough for encoding a 600-foot roll with an accuracy of 1.76 inches. Moreover, the information is read by use of sensing technology already implemented on the large scale printer in this exemplary embodiment, with higher precision than required.

The user will start loading a new roll, which will have the grayscale manufacturer code on its top left corner. Once the roll has been loaded, the first inch of it is normally cut away, so no media is wasted. The printer reads the manufacturer code during this loading process, and the media type and roll length information is loaded into the printer memory for use in subsequent plots.

The user may still unload the roll in the conventional way by just removing it, or unload it through the front panel menu, in which case a grayscale signature code indicia will be printed along the leading edge of the remaining media in the roll, e.g. at the top left corner of the roll. The first row of squares will be the same (media type) as in the manufacturer's code, i.e. with a first square of black for sensor calibration use if necessary, and five squares identifying the manufacturer's code, and the second row of squares will encode the remaining length. Thus, the grayscale pattern printed prior to unloading the roll is equal in size and the number of grayscale patterns to the pattern printed along the leading edge of a new roll by its manufacturer. The top row now being printed prior to unloading the roll is identical to the top row of the pattern printed by the manufacturer, since the manufacturer's code needs to be kept constant, in order to identify the media type correctly. The bottom row now will present a different grayscale pattern, due to a different remaining length.

Figure 6A:
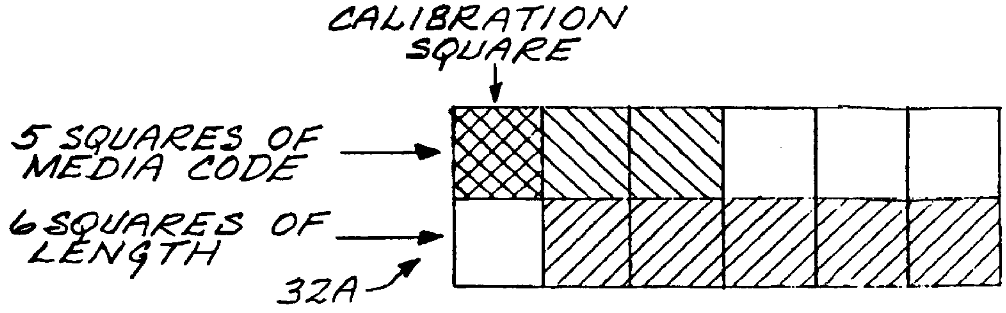
FIG. 6A shows grayscale encoding of a particular manufacturer's code for a new roll of print media and an initial roll length.
Figure 6B:
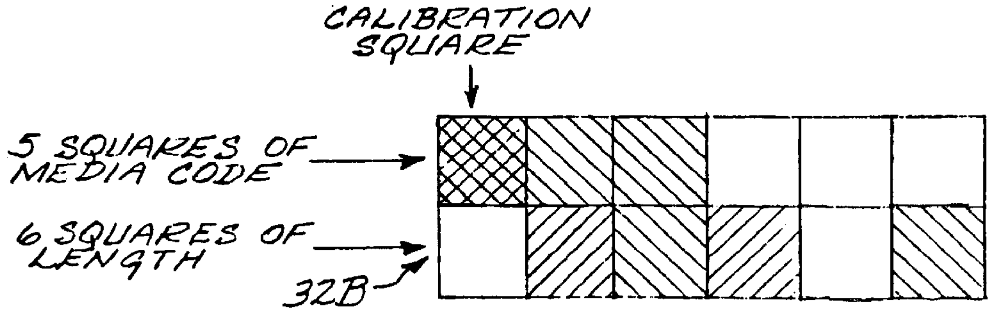
FIG. 6B shows an exemplary signature plot code indicia printed along the leading edge of the roll after some portion of the roll has been used, and just prior to removal of the roll from the printer.

This aspect of the invention is further explained with the following example. Assume that a media roll is a roll of Hewlett-Packard Heavy Coated media, with a media code 320. Assume also an accuracy of 1.76 inches for the length encoding. For a 100 foot roll, there are 1200 inches, which divided by 1.76 equals 0.682. The media code 320 corresponds to 01 0100 0000 in binary, and 682 corresponds to 0010 1010 1010. Then the particular grayscale code that the manufacturer will print or attach to the leading edge of each new media roll in this example is shown in FIG. 6 as pattern 32A. Now the printer will print three E-size plots, consuming 135 inches of the media roll. The remaining length is 1065 inches, or encoded as 1065/1.76=605, in binary as 0010 0110 0001. Assume now that the user decides to remove the roll from the media, say to load another media type for another print job. The printer will print along the leading edge of the roll, prior to its removal, a signature code 32B as shown in FIG. 6B, wherein the grayscale pattern for the top row of squares is identical to that of FIG. 6A, and the bottom row of squares encodes the value 605.

Figure 7:
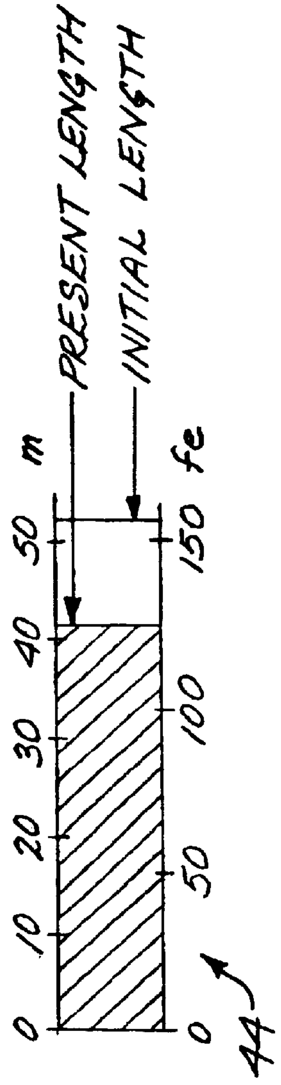
FIG. 7 illustrates an alternate media signature indicia.

Besides printing the grayscale indicia with the media type code and the length information at the top left corner of the roll, i.e. along the leading edge, where the printer will first encounter an indicia during optical sensing, the whole swath width of the leading edge will preferably contain the same information, in different and redundant ways. For redundancy, the grayscale code will be printed several times across the swath. This will allow the printer to re-read the information, in case the top-left code becomes smudged by the user. For human-readability, the media type and length information will also be printed in human-readable form, e.g. in letters and/or numbers, and in a graphical way. This is illustrated in FIG. 7 as indicia 44, which illustrates the initial length in one example, and a remaining or present length. The printer could still read the graphical length information, if all the grayscale codes were unclear. The graphical length information of the indicia 44 can be read by scanning across the length bar, and measuring the width between the rising and the falling edges of the sampled sequence. This reading technique is analogous to the technique presently used to measure the width of the print media, with the difference that black on white is measured instead of white (paper media) on dark (roller material).

Figure 8:
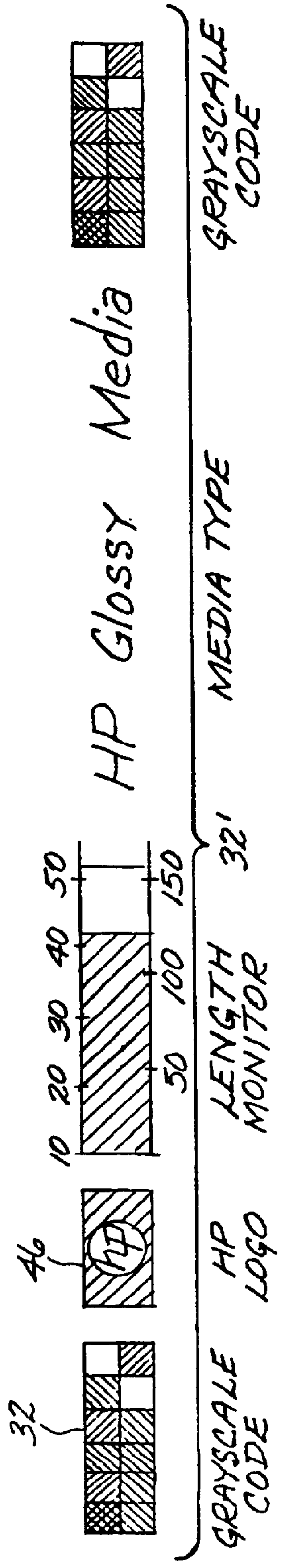
FIG. 8 illustrates a further alternate embodiment of a media signature plot, printed across the top inch of the media roll, which includes, from left to right, a grayscale code in machine readable form specifying the media type and remaining length, an exemplary manufacturer's logo, a human-readable graphical media length indicia, the media type printed in text form, and a repeat of the grayscale code.

An exemplary signature plot indicia 32' is illustrated in FIG. 8, printed across the top inch of the media roll, which includes, from left to right, a grayscale code 32 in machine readable form specifying the media type and remaining length, an exemplary manufacturer's logo 46, a human-readable graphical media length indicia 44, the media type printed in text (shown here in English; other languages will be employed depending on the country of distribution or use), and a repeat of the grayscale code 32.

After the signature plot has been printed on the leading edge of the roll of media, the printer automatically unloads the roll, by moving the media roll backwards, about 50 cm. The signature plot needs to be configured with the right amount of ink, in order not to present drying time problems. The roll will be stored, and the user and the printer will always be able to identify it precisely by reading the signature code 32'.

While the indicia preferably has both machine readable and human readable components, the indicia could include just the machine readable components, in which case the printer will have a sensor capability for reading the indicia and providing the indicia data to the printer controller for use in printing operations using the roll. Alternatively, the indicia could include just the human readable component, and so in this case the user will read the data printed on the media, and manually input the data relating to roll length, and media type if this data is included, into the printer using an input device such as a front panel keypad or other known type of data entry. The printer controller thus receives the manually entered data, and can use this data during subsequent printing operations using the roll.

In accordance with another aspect of the invention, a functionality is provide to allow the user to assign a specific code for that media. This can be useful for those media types which are not in widespread use, but that some particular customer generally uses. For example, the upper row of the signature code indicia 32 has five available squares, providing 10 bits of information. These 10 bits could be allocated as 5 bits for a vendor code, and 5 bits for a media type. This would allow for 32 different vendor codes, with 32 media types per vendor. In this case, the end user could have one vendor code assigned, so that the user himself could assign his own defined media types. The media code, i.e. the vendor code and media type code, can be used in correspondence with the Printer Extended Language, that allows colormap and printmode definitions for each media, and which can be downloaded to the printer.

While grayscale encoding has been described above for the purpose of encoding the media type and length information, other techniques for encoding this information could alternatively be employed, such as, e.g., bar coding techniques.

When loading a used media roll, as usual, the printer will try to scan the top-left gray-scale code, or any other of the signature codes, in order to learn the media type and remaining roll length. If it fails to read this information, the printer can still ask for this information from the user via front panel display messages. Alternatively, the user can manually input the length data and/or media type data manually through the front panel or other data input function.

Among the advantages of this invention is that the encoding is easy to transfer to different media vendors. Since the signature code can include vendor code as well as media type, a single vendor can have multiple media types. While the media code will be replicated as part of the signature code each time the roll is removed from the printer, the length code will define remaining length information, which is recalculated and printed by the printer onto the media roll, as a consequence of the media roll being partially spent. The media code and roll length information can be supplied in machine-readable and human-readable formats, with redundancy in case of code smudging problems, for example. The bit assignments for media code and length can have many different forms. The media code and length code are printed on and read from a portion of the media roll, which keeps the information attached to its object. Also, an existing sensor technology on the printer can be employed for reading the code, although of course in other embodiments a sensor can be added to the printer for reading the signature code, or the sensor can be omitted, and the data printed on the roll entered into the printer manually by the user. Media loading is easier, and it provides unattendedness capabilities. Further, the technique is robust because of code redundancy, and provides human-readable information, specially valuable for customers dealing with many spare rolls at once. The material cost is very small (1 inch of media per roll load).

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for identifying at least a media length value for a roll-type media to be printed upon to a printer controller in a printer, comprising:

keeping track of the length of media used during printing operations;

prior to removing the roll from the printer, printing an indicia on a remaining portion of the roll which is indicative of at least the remaining length of said media;

removing the roll from the printer;

installing the removed roll from the printer;

reading the indicia to determine the remaining length of said media;

using said remaining length information during subsequent printing operations.

2. The method of claim 1 wherein said printing an indicia on a remaining portion of the roll includes printing the indicia in human-readable form, and said step of reading the indicia is performed by a printer user.

3. The method of claim 2 wherein said step of using said remaining length information includes manually inputting said information into a memory of the printer controller.

4. The method of claim 1 wherein said printing an indicia on a remaining portion of the roll includes printing the indicia in machine-readable form, and said step of reading the indicia includes using a sensor to read said indicia.

5. The method of claim 4 wherein said printing of said indicia comprising printing a grayscale code along a leading edge of the remaining portion of the roll of print media.

6. The method of claim 1 wherein said indicia further identifies a media type of said media, and wherein said step of reading the indicia includes reading the indicia to identify the media type of said roll of media.

7. The method of claim 1 wherein said step of printing said indicia includes printing the indicia along a leading edge of the roll of print media.

8. The method of claim 1 wherein said indicia includes a human-readable portion identifying said remaining length.

9. The method of claim 8 wherein said human-readable portion is a graphical indicia indicating said remaining length, and said graphical indicia is also a machine-readable form.

10. The method of claim 1 wherein said indicia further includes a user-assigned code identifying a media type.

11. A method for identifying a roll-type media to be printed upon to a printer controller in a printer, comprising:

reading data printed on a portion of the media which identifies the type of media and its length;

storing said data and employing said data to establish print control parameters and determining that sufficient media remains on the roll for a print job;

conducting at least one print operation, while keeping track of the length of media used during said printing operation;

in response to a user command to remove the roll from the printer, and prior to removal of the roll from the printer, printing an indicia on a remaining portion of the roll which identifies the remaining length of the print media; and removing the roll from the printer.

12. The method of claim 11, further comprising:

installing the removed roll from the printer;

reading the indicia to determine the remaining length of said media;

using said remaining length information during subsequent printing operations.

13. The method of claim 12 wherein said step of using said remaining length information includes manually inputting said information into a memory of the printer controller.

14. The method of claim 11 wherein said printing an indicia on a remaining portion of the roll includes printing the indicia in machine-readable form.

15. The method of claim 14 wherein said printing of said indicia comprising printing a grayscale code.

16. The method of claim 11 wherein said step of printing said indicia includes printing the indicia along a leading edge of the roll of print media.

17. The method of claim 8 wherein said indicia includes a human-readable portion identifying said remaining length and a machine-readable portion identifying said remaining length.

18. The method of claim 17 wherein said human-readable portion is a graphical indicia indicating said remaining length.

19. The method of claim 11 wherein said indicia further includes indicia identifying a media type.

20. Apparatus for identifying at least a media length value for a roll-type media to be printed upon to a printer controller in a printer, comprising:

a transducer for reading data printed on a portion of the media which, at least, identifies a length of said roll of media;

an electronic controller for storing the data and employing said data to determine whether sufficient media remains in the roll for a print job;

a cutter apparatus responsive to an output from said controller for removing a portion of the media from the roll; and wherein the controller is adapted, upon occurrence of an event, to cause printing of said data on said portion of said media.

21. The apparatus of claim 20, wherein said data are printed on a leading edge of the media.

22. The apparatus of claim 20 wherein the roll of media has provided on a leading edge of the media prior to installation of the roll in the printer a manufacturer indicia identifying the media type and roll length.

23. The apparatus of claim 20 wherein said event is an indication of a removal of said roll from said printer.

24. The apparatus of claim 20 wherein said data includes a human-readable portion identifying said remaining length.

25. The apparatus of claim 24 wherein said human-readable portion is a graphical indicia indicating said remaining length.

26. The apparatus of claim 20 wherein said indicia includes a machine-readable indicia printed along a leading edge of the portion of the roll of print media.

27. The apparatus of claim 20 wherein said data further identifies a media type of said media, and wherein said controller is further adapted to read the data to identify the media type of said roll of media.

28. The apparatus of claim 20 wherein said indicia further includes a user-assigned code identifying a media type.

* * * * *